United States Patent
Dietrich et al.

(10) Patent No.: US 6,693,312 B2
(45) Date of Patent: Feb. 17, 2004

(54) METHOD FOR FABRICATING AN OPTICAL TRANSMITTING SUBASSEMBLY

(75) Inventors: Ralf Dietrich, München (DE); Mathias Kämpf, Maxhütte-Haidhof (DE); Wolfgang Gramann, Regensburg (DE); Martin Weigert, Berlin (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/200,420

(22) Filed: Jul. 22, 2002

(65) Prior Publication Data

US 2003/0057443 A1 Mar. 27, 2003

Related U.S. Application Data

(63) Continuation of application No. PCT/DE01/00229, filed on Jan. 15, 2001.

(30) Foreign Application Priority Data

Jan. 20, 2000 (DE) .......................... 100 02 329

(51) Int. Cl.⁷ .......................................... H01L 31/0328
(52) U.S. Cl. .................... 257/200; 372/107; 372/50; 372/64
(58) Field of Search .................... 257/200; 372/107, 372/64, 50

(56) References Cited

U.S. PATENT DOCUMENTS

| | | | |
|---|---|---|---|
| 5,637,885 A | 6/1997 | Heinemann et al. | 257/84 |
| 5,650,123 A | 7/1997 | Saini et al. | 422/82.11 |
| 5,875,205 A | 2/1999 | Spaeth et al. | 372/50 |
| 2003/0057443 A1 * | 3/2003 | Dietrich et al. | 257/200 |

FOREIGN PATENT DOCUMENTS

| | | | |
|---|---|---|---|
| DE | 38 19 811 A1 | 12/1989 | |
| DE | 42 11 899 A1 | 10/1993 | |
| DE | 198 10 624 A1 | 9/1999 | |
| EP | 0 660 467 A1 | 6/1995 | |
| EP | 0 822 430 A2 | 2/1998 | |
| JP | 61 121 014 | 6/1986 | |
| JP | 5-13749 | 1/1993 | |
| WO | WO0153868 A3 * | 1/2001 | G02B/6/42 |

* cited by examiner

*Primary Examiner*—Leon Scott, Jr.
(74) *Attorney, Agent, or Firm*—Laurence A. Greenberg; Werner H. Stemer; Gregory L. Mayback

(57) ABSTRACT

A photo-optical transmitter assembly is produced in the following manner: a glass wafer is fixed onto a transparent submount and a V-shaped recess is subsequently created between optical prism elements using targeted sawcuts. A rod-shaped element with a reflective coating is inserted into the V-shaped recess. A laser beam from a semiconductor laser is thus deflected by 90° on the rod-shaped element with the reflective coating and traverses the submount.

22 Claims, 4 Drawing Sheets

METHOD FOR FABRICATING AN OPTICAL TRANSMITTING SUBASSEMBLY

CROSS-REFERENCE TO RELATED APPLICATION

This application is a continuation of copending International Application No. PCT/DE01/00229, filed Jan. 15, 2001, which designated the United States and which was not published in English.

BACKGROUND OF THE INVENTION

Field of the Invention

The present invention relates to a production process for an optical transmitting subassembly. Transmitting subassemblies of the generic type are used for example in beam deflection receptacles for fiber-optic transmitting components or combined transmitting/receiving components. In these transmitting subassemblies, an output bundle of rays is generated by an edge-emitting laser diode and deflected, typically through 90°, in a first deflection. For this purpose, the laser diode is mounted on a submount, as it is known, on which glass optical prism elements for the deflection of the output bundle of rays from the laser diode are likewise fastened.

FIG. 1 shows an overall view of a fiber-optic transmitting component in longitudinal section along an optical glass fiber 23 coupled to the component. The component has a mounting platform 25, which is preferably fabricated from metal and has a circular through opening on its one long side. On one side of this circular passage opening, a transmitting subassembly 100 is mounted and, on the other side of the circular passage opening, a cut-out is provided into which a tubular part holding a spherical lens 26 and belonging to a beam deflection receptacle 22 projects. The beam deflection receptacle 22 also has a beveled face in the interior, on which a deflection mirror 24 is provided. The transmitting subassembly 10 is mounted on a silicon submount 1 and substantially comprises an edge-emitting semiconductor laser 6 and optical prism elements 2a, 2b and 2c fabricated from glass, between which a highly reflective interface is formed at 45° to the laser ray or to the surface of the submount. A bundle of laser radiation emitted by the semiconductor laser 6 is thus deflected through 90° at this interface in the direction of the submount 1. The latter is transparent to the laser radiation. The bundle of laser radiation passes through the circular passage opening in the mounting platform 25 and is focused by the spherical lens 26. The bundle of rays then strikes the deflection mirror 24 and is directed by the latter onto the entry surface of the glass fiber 23.

Hitherto, the transmitting subassembly 100 has been produced by the optical prism deflection elements 2a, 2b and 2c being produced individually, placed on the submount 1, aligned with one another and bonded adhesively or anodically. The faces of the optical prism elements were produced by grinding and polishing techniques. A mirror coating was applied to the prism face contributing to the beam deflection. Production processes of this type are known, for example from German published patent application DE 198 10 624 and U.S. Pat. No. 5,875,205 (see, European patent application EP 0 660 467).

That production process proves to be relatively cumbersome, since the optical prism elements 2a and 2b first of all have to be fabricated separately and then have to be fastened to the submount individually in a specific alignment in relation to one another. The expenditure of a relatively large amount of time is therefore necessary for the completion of an individual transmitting subassembly.

U.S. Pat. No. 5,637,885 (German published patent application DE 42 11 899) describes a process for the production of a microsystem, wherein a plurality of wafers are joined to form a wafer composite. In this case, the joining is carried out after the individual wafers have finally been structured.

SUMMARY OF THE INVENTION

It is accordingly an object of the invention to provide a fabrication method for an optical transmitter subassembly, which overcomes the above-mentioned disadvantages of the heretofore-known devices and methods of this general type and which provides for reduced time needed for the production.

With the foregoing and other objects in view there is provided, in accordance with the invention, a method of producing an optical transmitting subassembly, which comprises:
a) joining a transparent submount wafer and a glass wafer at their main surfaces;
b) shaping a recess in the glass wafer, the recess having at least one side wall enclosing an angle of substantially 45° with the main surface of the submount wafer;
c) mounting a semiconductor laser on the submount wafer such that, during an operation thereof, the laser emits a bundle of rays into the glass wafer in a direction towards the at least one side wall of the recess; and
d) rendering the at least one side wall of the recess highly reflective for the bundle of rays.

In other words, the objects of the invention are achieved with a fabrication process for an optical transmitting subassembly. In the method, first of all a transparent submount wafer and a glass wafer are joined to each other at their main surfaces, then a recess is shaped in the glass wafer, having at least one side wall which substantially forms a 45° angle with the surface of the submount wafer, a semiconductor laser is then mounted on the submount wafer in such a way that during operation it emits a bundle of rays into the glass wafer in the direction of the at least one side wall of the recess, and the at least one side wall of the recess is acted on in such a way that it becomes highly reflective for the bundle of rays.

Therefore, according to the invention, the joining of a submount wafer and of a glass wafer is carried out without already structured faces being present on the glass wafer. Structuring of the glass wafer is carried out only after it has been joined to the submount wafer.

The transparent submount wafer preferably consists of a material of relatively high thermal conductivity, so that it exhibits the properties of a heat sink.

In a preferred exemplary embodiment, a V-shaped recess is shaped in process step b) and, in process step d), at least one of the mutually opposite side walls of the V-shaped recess is acted on in the manner described. For this purpose, it proves to be advantageous if the mutually opposite side walls substantially form a 90° angle with each other.

It proves to be expedient and advantageous if, before process step a), recesses are shaped, for example by means of wet chemical etching, at a suitable point into the main surface of the glass wafer that is to be joined to the submount wafer, so that the glass wafer is subsequently not joined to the submount wafer in the area of these recesses in process step a). As a result, after process step a) or process step b), the areas of the glass wafer which are located over the recesses and not needed can then be removed relatively easily, preferably by sawing.

The V-shaped recess can advantageously be shaped by a V-shaped groove being produced in the glass wafer by means of a V-shaped saw blade, such as a parting and grinding blade or the like. In this case, the V-shaped recess can firstly be pre-sawn with a coarse-grained parting and grinding blade and then re-sawn with a fine-grained parting and grinding blade.

In an advantageous exemplary embodiment, which is still to be explained, only two prism-like optical glass elements still remain standing on the submount wafer after the sawing steps outlined have been carried out.

In process step d), a rod-like element with a substantially right-angled triangular cross section and having a horizontal upper supporting face is introduced into the V-shaped recess. Before the introduction of the rod-like element, one of its equilateral side walls is provided with a reflective coating. The rod-like element is firstly shaped as a rod with a rectangular cross section and then, before or after introduction into the V-shaped recess, an area of the rod on the side facing away from the submount wafer is removed in such a way that a horizontal supporting face is formed. This face can be used to arrange an optical receiver on it, so that the transmitting subassembly can be used in a combined transmitting/receiving component.

A rod with a rectangular cross section can be obtained, for example, by a glass wafer being provided with a reflective coating on one main surface and being divided up into a number of rods.

The submount wafer is preferably formed by a semiconductor wafer, in particular a silicon wafer, if it is sufficiently transparent for the necessary wavelength.

As already described, it may be necessary at an arbitrary time after process step a) has been carried out, for sections of the submount wafer outside the beam deflection section to be shaped or already shaped to be exposed by removing appropriate areas of the glass wafer, preferably those areas which are situated over the shaped recesses, in order that the semiconductor laser and, if appropriate, a monitor diode can be mounted on these sections of the submount wafer.

In accordance with another feature of the invention, in the shaping operation of the recess in step b), the glass wafer is severed.

In accordance with a concomitant feature of the invention, the semiconductor laser is mounted in step c) such that the bundle of rays of the laser is emitted parallel to the surface of the submount wafer.

Other features which are considered as characteristic for the invention are set forth in the appended claims.

Although the invention is illustrated and described herein as embodied in a production process for an optical transmitting subassembly, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

FIGS. 2, 3 and 5 to 7 illustrate an exemplary embodiment of the method according to the invention for the production of an optical transmitting subassembly, using cross-sectional illustrations of the intermediate products after individual process steps.

Figure 2:
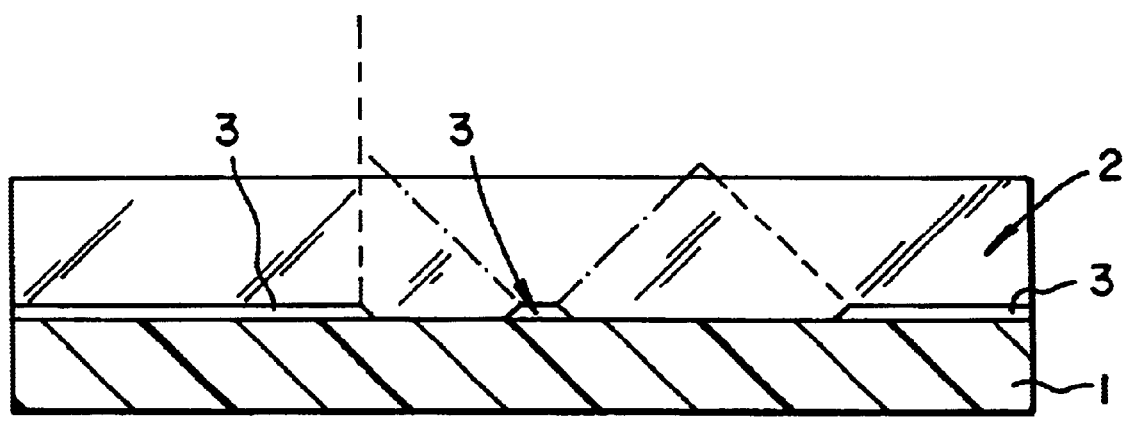
FIG. 2 is a diagrammatic side view of a submount wafer and a glass wafer, which are joined to each other at their main surfaces.

FIG. 2 shows how, first of all, a submount wafer 1 and a glass wafer 2 are joined to each other at their main surfaces. In a later process step, a semiconductor laser 6 is to be mounted on the submount wafer 1. For this reason, the submount wafer should have the properties of a heat sink, and therefore consist of a material of the highest possible thermal conductivity. Silicon is used as the preferred material for the submount wafer 1.

In the main surface of the glass wafer 2, preferably before being joined to the silicon wafer 1, cut-outs 3 are shaped which make it possible, in the following process step, easily to sever an area underneath the V-shaped cut-out to be shaped and specific areas of the glass wafer 2 outside the prismatic beam deflection device to be shaped. These cut-outs 3 are preferably produced by wet chemical etching.

Then, in areas wherein no cut-outs 3 have been produced, the glass wafer 2 is joined to the submount wafer 1. Anodic bonding is preferably used as the joining technique.

Figure 3:
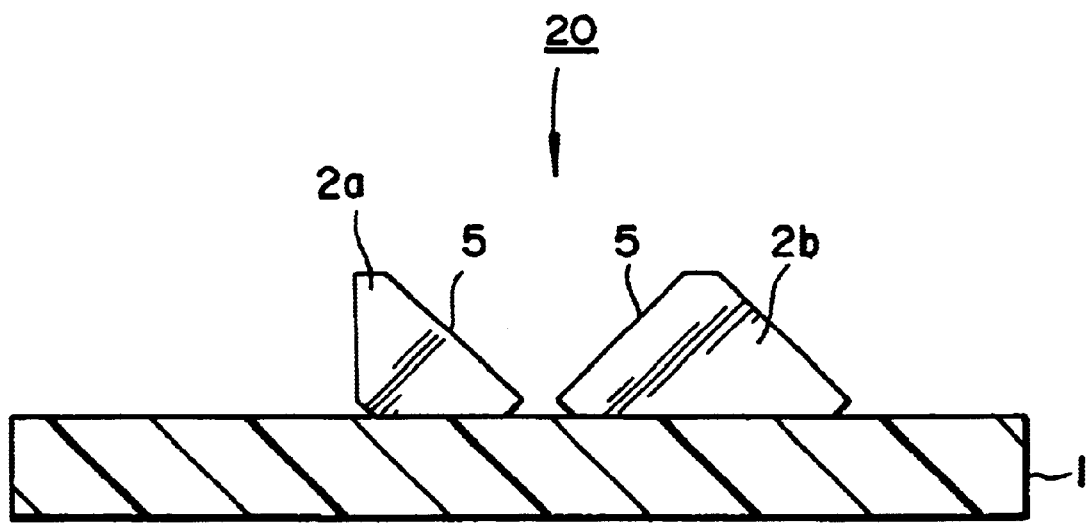
FIG. 3 is a diagrammatic view of the V-shaped recess shaped in the glass wafer in FIG. 2.

FIG. 3 illustrates an intermediate product following removal of the areas of the glass wafer 2 which are not needed. These areas are preferably removed by way of sawing. In FIG. 2, two dashed saw cut lines are indicated, by means of which the outer areas of the glass wafer 2 are divided off. Then, by means of a V-shaped saw blade, in particular a V-shaped parting and grinding blade, a V-shaped groove 20 of predefined length is produced in the glass wafer 2, above a central cutout 3. This sawing is indicated by two dash-dotted lines in FIG. 2. The V-shaped groove 20 has a shape such that its side walls are inclined at 90° to each other and their imaginary intersection line lies on the surface of the submount wafer 1 and said side walls in each case form a 45° angle with the surface of the submount wafer 1. The side walls 5 produced in the process therefore likewise form a 45° angle with the direction of incidence of the bundle of laser rays from the semiconductor laser 6 to be mounted later (see FIG. 7). The aforementioned central cut-out 3 ensures that when sawing the V groove, it is not necessary to saw as far as the surface of the submount wafer 1.

In order to produce surfaces with low roughness, the V-shaped recess 20 can firstly be pre-sawn with a relatively coarse-grained parting and grinding blade and then re-sawn with a relatively fine-grained parting and grinding blade.

As a result of the sawing steps, two optical prism elements 2a and 2b are therefore left behind on the submount wafer 1, between which the aforementioned V-profile 20 has been shaped. This process for the production of the optical prism elements 2a and 2b constitutes a simplification as compared with the separate production, known in the prior art, of the individual optical prism elements and placement on the submount wafer 1.

Figure 4:
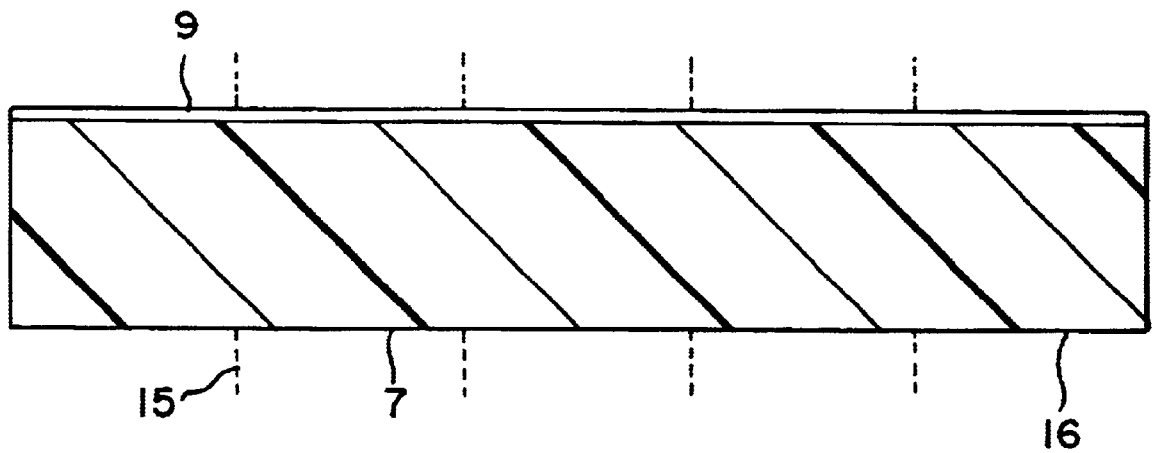
FIG. 4 is an elevational view of a glass wafer provided with a reflective coating as an initial product for the production of reflective-coated rods.

FIG. 4 indicates how a plurality of so-called reflection rods 7 can be produced. The rods 7 are provided to be inserted into the V-shaped profile. A glass wafer 16 is provided with a reflective coating 9 and sawn up along saw cut lines 15 into individual rods 7 of the same width. The reflective coating 9 can be a metallic coating or a series of dielectric layers.

Figure 5:
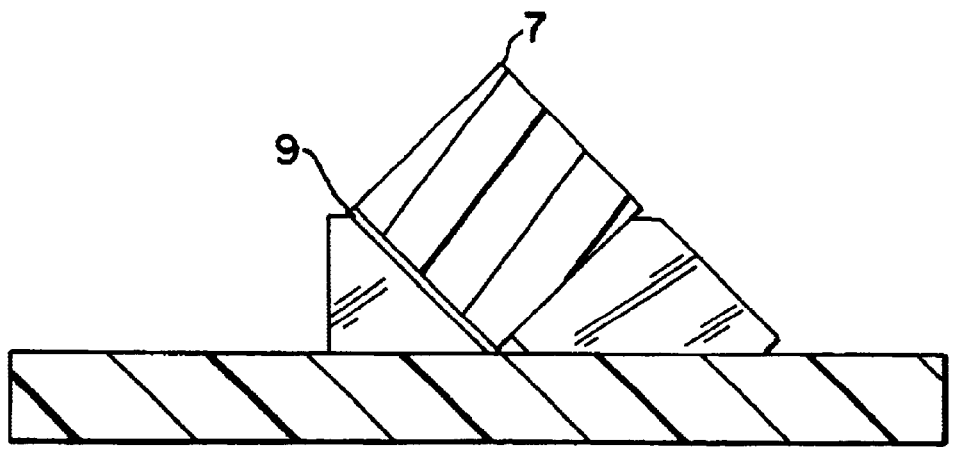
FIG. 5 is an end view of a reflective-coated rod inserted into the V-shaped recess of FIG. 3.

Then, according to FIG. 5, an individual rod 7, which preferably has the same length as the V-shaped groove 20, is inserted into the V-groove and bonded therein, the reflective coating 9 being arranged on that side face of the V-groove on which the bundle of laser rays from the semiconductor laser 6 yet to be mounted (see FIG. 7) enters the optical prism element 2a. The rod 7 is therefore arranged in the V-groove 20 in such a way that the reflective coating 9 forms a 45° angle with the bundle of laser rays.

Figure 6:
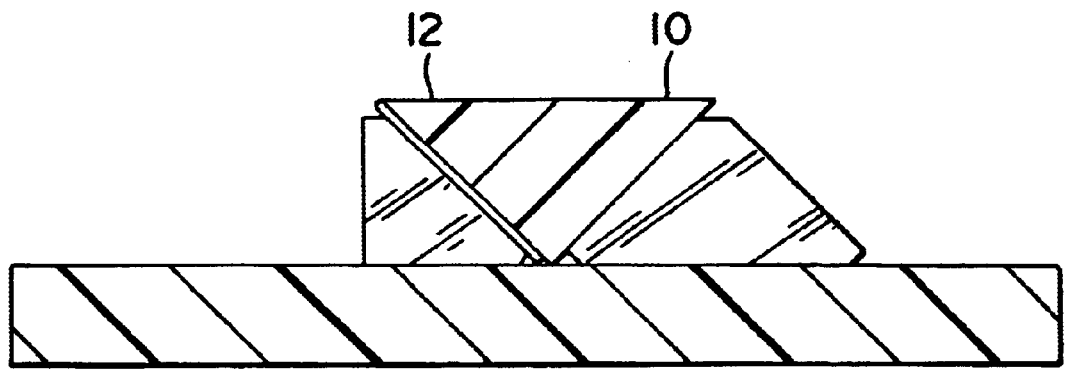
FIG. 6 shows a positioned, reflective-coated rod from FIG. 5 which, on its upper side, is flattened to form a mounting face.

Then, as illustrated in FIG. 6, the area of the rod 7 facing away from the submount wafer 1 can be removed in such a way that a flat mounting face 10 can be formed. In the process, the rod 7 is preferably ground off until a flat mounting face has been achieved. This flat mounting face is then polished in a suitable manner, so that it can be used to hold and fix an optical receiver 11 (see FIG. 7).

As a result, an elongate, rod-like element 12 with a right-angled triangular cross section is therefore positioned in the V-groove. This rod-like element 12 preferably has the same length as the V-shaped groove. The rod-like element 12 can also be produced in a way different from the way described above. For example, it can be sawn in this form from a glass wafer, the glass wafer either already having a reflective coating 9 or the latter only then being applied to one of the side walls of the rod-like element 12.

It is likewise conceivable for no rod-like element 12 to be inserted into the V-shaped groove, but for the side face of the V-shaped groove facing the semiconductor laser 6 to be mounted (see FIG. 7) to be provided with a suitable reflective coating.

Figure 7:
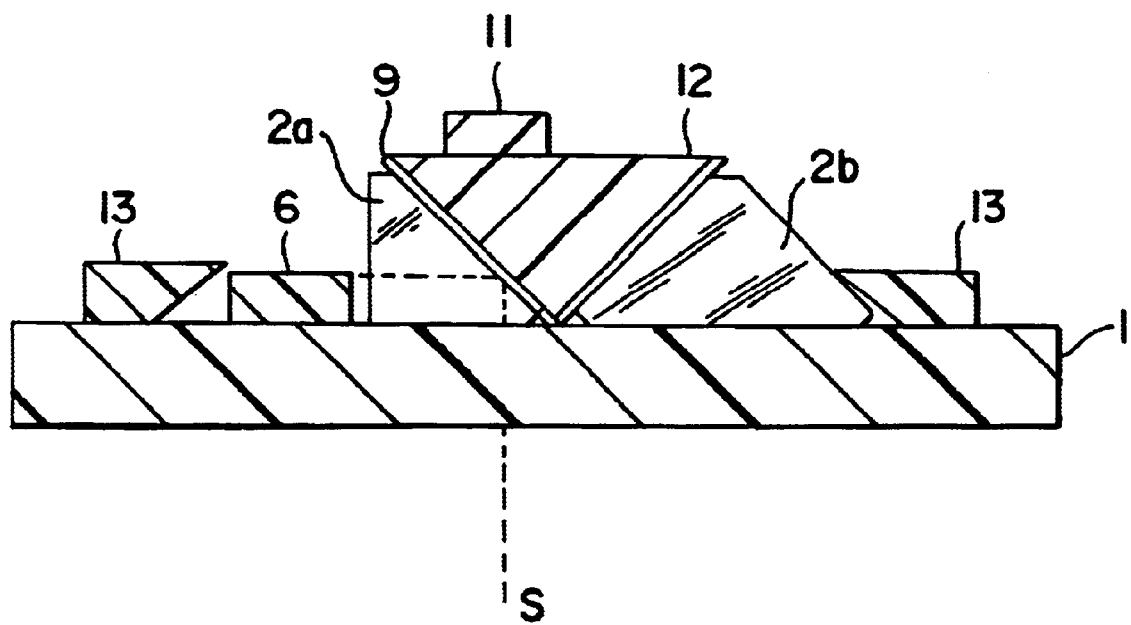
FIG. 7 shows the configuration of FIG. 6, wherein an optical receiver is mounted on the mounting face and a semiconductor laser and monitor diodes are arranged on exposed sections of the submount wafer.

Finally, FIG. 7 further shows how a semiconductor laser 6, preferably an edge-emitting semiconductor laser 6, is mounted on the exposed surface 8 of the submount wafer 4, in such a way that the bundle of laser rays S emitted by it falls into the optical prism element 2a and is reflected downward at a 90° angle at the reflective coating 9 of the rod-like element 12 and passes through the transparent submount wafer 1. A monitor diode 13 can either be arranged behind the semiconductor laser 6 and therefore detects the low proportion of the laser radiation passing through the rear resonator mirror or it can be arranged on the other side of the optical prism element 2b, and therefore detects the low proportion of the radiation passing through the reflective coating 9.

The optical receiver 11, preferably a receiver diode such as a PIN diode, can detect a received beam arriving in the optical fiber 23 (see FIG. 1), a low proportion passing through the reflective coating 9 and striking the optical receiver 11, for example. In a combined transmitting/receiving component, however, provision can also be made for the reflective coating 9 to exhibit a wavelength-dependent reflectivity and transmissivity, so that, for example, a transmitting beam at a first wavelength experiences a high reflectivity, while a receiving beam at a second wavelength experiences a high transmissivity of the reflective coating 9.

Figure 1:
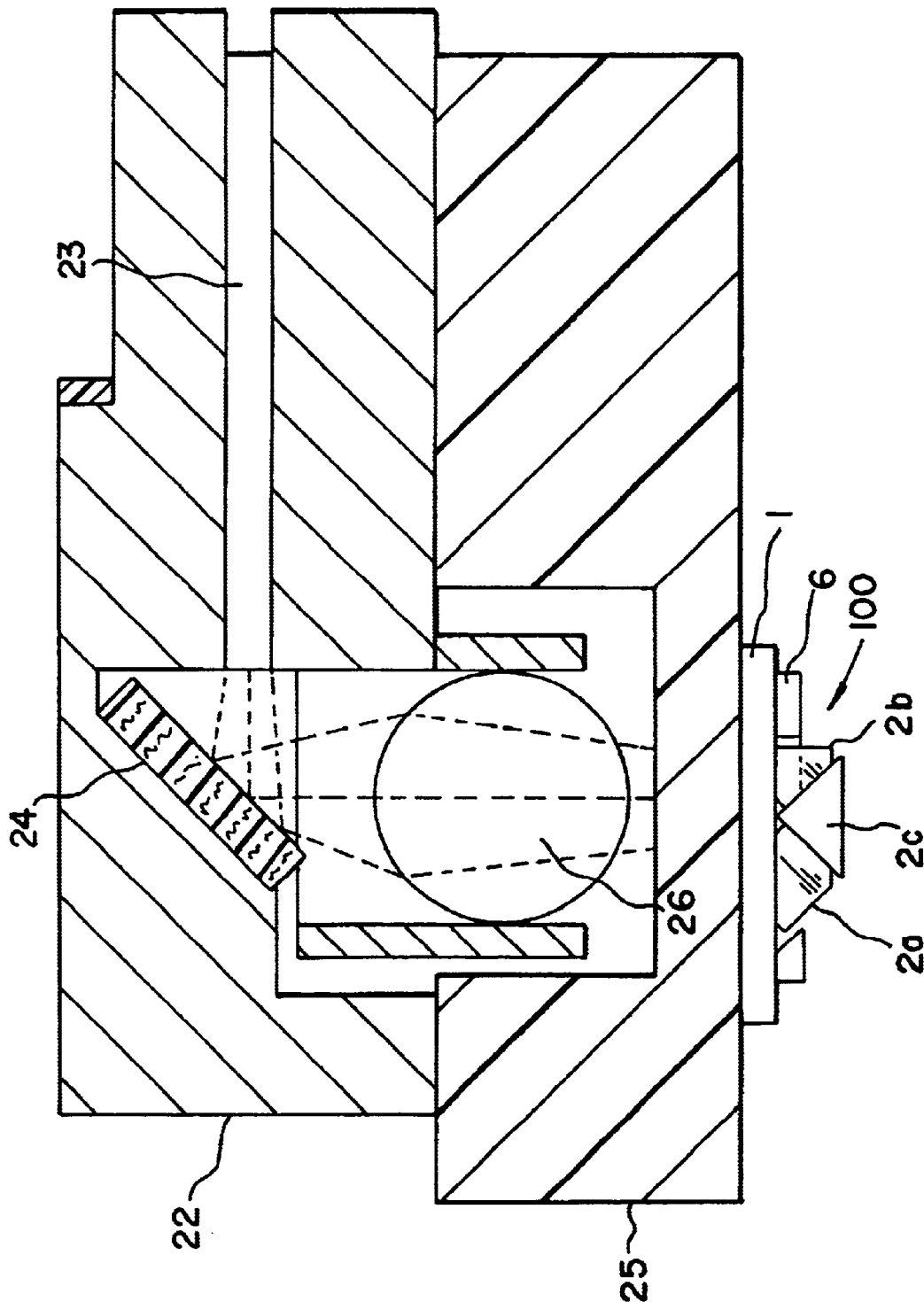
FIG. 1 shows an overall diagrammatic view of a fiber-optic transmitting component.

Ultimately, the finally processed transmitting subassembly illustrated in FIG. 7, as already described in connection with FIG. 1, can be joined to a mounting platform 25 in order to form a complete transmitting component or combined transmitting/receiving component, by the transparent submount wafer 1 being adhesively bonded onto a surface of the mounting platform 25. An optical beam guidance device, such as a beam deflection receptacle with a fiber connection, can be mounted on the opposite surface of the mounting platform 25.

We claim:

1. A method of producing an optical transmitting subassembly, which comprises:
    a) joining a transparent submount wafer and a glass wafer at main surfaces thereof;
    b) shaping a recess in the glass wafer, the recess having at least one side wall enclosing an angle of substantially 45° with the main surface of the submount wafer;
    c) mounting a semiconductor laser on the submount wafer such that, during an operation thereof, the laser emits a bundle of rays into the glass wafer in a direction towards the at least one side wall of the recess; and
    d) rendering the at least one side wall of the recess highly reflective for the bundle of rays.

2. The method according to claim 1, wherein step b) comprises forming the recess V-shaped with mutually opposite side walls, and step d) comprises acting upon at least one of the mutually opposite side walls to render the at least one side wall highly reflective.

3. The method according to claim 2, wherein the mutually opposite side walls of the V-shaped recess form an angle of substantially 90° with one another.

4. The method according to claim 2, wherein step b) further comprises shaping the V-shaped recess by forming a V-shaped groove in the glass wafer with a V-shaped saw blade.

5. The method according to claim 4, wherein the V-shaped saw blade is a parting and grinding blade.

6. The method according to claim 4, which comprises first pre-sawing the V-shaped recess with a relatively coarse-grained parting and grinding blade and then re-sawing with a relatively fine-grained parting and grinding blade.

7. The method according to claim 1, which comprises:
    prior to step a), shaping recesses into the main surface of the glass wafer to be joined to the submount wafer, such that the glass wafer is not joined to the submount wafer in an area of the recesses when the submount and the glass wafer are joined in step a); and
    subsequent to step a), sawing to remove areas of the glass wafer located over the recesses.

8. The method according to claim 7, wherein the sawing step is performed following step b).

9. The method according to claim 1, wherein step d) comprises introducing a rod-shaped element with a substantially right-angled triangular cross section and a horizontal upper supporting face into the V-shaped recess.

10. The method according to claim 9, which comprises, prior to the step of introducing the rod-shaped element, coating one equilateral side wall thereof with a reflective coating.

11. The method according to claim 1, wherein the submount wafer is a semiconductor wafer.

12. The method according to claim 11, wherein the submount wafer is a silicon wafer.

13. The method according to claim 9, which comprises:
first shaping the element as a rod with a rectangular cross section and then;
prior to or subsequent to introducing the element into the V-shaped recess, removing an area of the rod on a side facing away from the submount wafer to thereby form a horizontal supporting face.

14. The method according to claim 13, which comprises arranging an optical receiver on the supporting face.

15. The method according to claim 13, which comprises producing the rod by coating one main surface of a glass wafer with a reflective coating and dividing the glass wafer into a number of rods.

16. The method according to claim 13, which comprises grinding off the rod to form the horizontal supporting face, and subsequently polishing the horizontal supporting face.

17. The method according to claim 13, which comprises gluing the rod into the V-shaped recess.

18. The method according to claim 9, which comprises gluing the rod-shaped element into the V-shaped recess.

19. The method according to claim 1, which comprises:
at an arbitrary time after step a) has been carried out, exposing sections of the submount wafer outside a beam deflection section by removing appropriate areas of the glass wafer; and
subsequently mounting the semiconductor laser on the exposed sections.

20. The method according to claim 19, which comprises mounting a monitoring diode.

21. The method according to claim 1, which comprises shaping the recess in step b) to sever the glass wafer.

22. The method according to claim 1, which comprises mounting the semiconductor laser in step c) such that the bundle of rays of the laser is emitted parallel to the surface of the submount wafer.

* * * * *